(No Model.)

T. B. HOWE.
CAR WHEEL.

No. 265,262. Patented Oct. 3, 1882.

WITNESSES:
W. H. H. Knight
W. C. Johnston

INVENTOR
Thomas B. Howe,
by Melville Church,
his Attorney

UNITED STATES PATENT OFFICE.

THOMAS B. HOWE, OF SCRANTON, PENNSYLVANIA.

CAR-WHEEL.

SPECIFICATION forming part of Letters Patent No. 265,262, dated October 3, 1882.

Application filed July 29, 1882. (No model.)

*To all whom it may concern:*

Be it known that I, THOMAS B. HOWE, of Scranton, in the county of Lackawanna and State of Pennsylvania, have invented a certain new and Improved Brake-Rim for Car-Wheels; and I do hereby declare the following to be a full, clear, and exact description of the same, reference being had to the accompanying drawings, forming part of this specification, in which—

Figure 1:
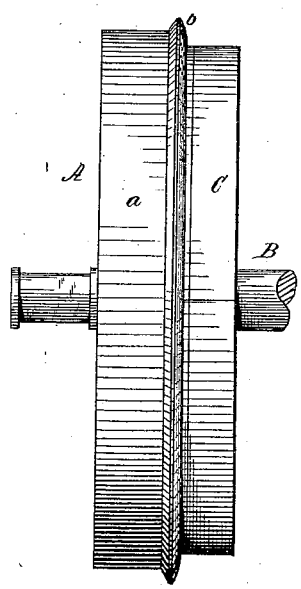
Figure 2:
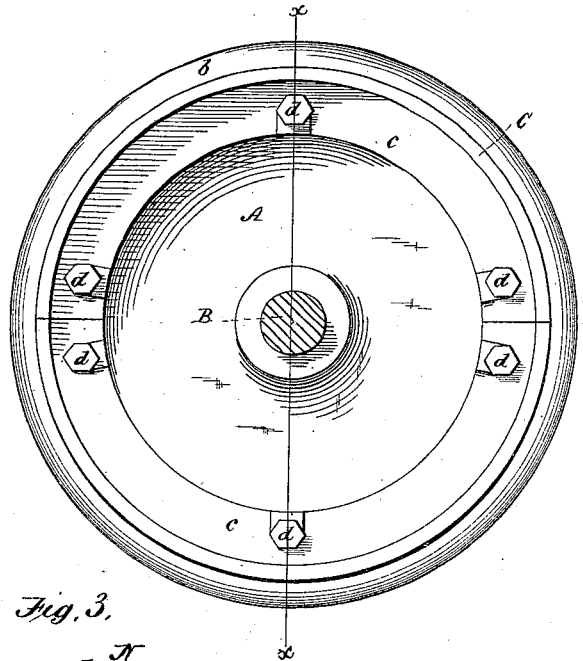
Figure 3:
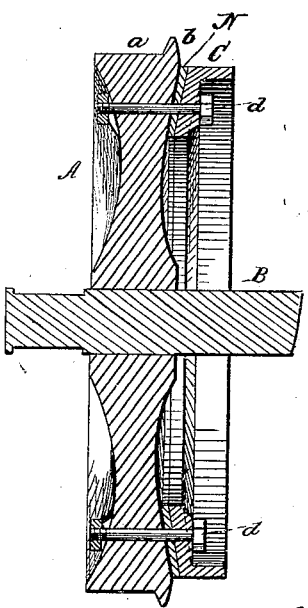

Figure 1 is an edge view of a car-wheel with my improved brake-rim applied thereto. Fig. 2 is a side view of the same; and Fig. 3 is a sectional view taken on the line $x\ x$, Fig. 2.

Similar letters of reference in the several figures denote the same parts.

In the construction and equipment of railroad-cars prior to my invention it has been the common practice to apply the brake-shoes directly to the treads of the transporting-wheels; but inasmuch as such wheels are usually constructed of chilled or tempered cast-iron, and as the brake-shoes are often so continuously applied as to highly heat the wheels, it results that the temper is soon taken out of the wheels and they crack, break, and wear to a greater extent than they otherwise would. Moreover, as the brake-shoes and their beams extend in front of the wheel-treads, it follows that when from any cause they become loosened or torn from their fastenings and drop down, as is frequently the case, they fall upon the track, and the wheels running upon them cause the derailment of the cars and oftentimes serious accidents.

To preserve the strength of the wheels and to provide more effectually against accidents from the causes mentioned, is therefore the object of my invention; and to this end it consists primarily in the application of an independent brake-rim to the side of a car-wheel for the brake-shoe to co-operate against, said brake-rim being bolted or otherwise rigidly secured to the wheel, but not in any way directly connected to the axle.

It further consists in constructing the brake-rim in two or more separate sections, so as to permit of the necessary expansion and contraction.

It further consists in the interposition of a non-conducting substance or material between the brake-rim and the wheel to prevent the communication to the wheel of any heat generated by the friction of the brake-shoe upon the rim, all of which I will now proceed to describe at length.

Referring to the drawings, A represents a car-wheel fixed to its axle B in the usual manner, and having the customary tread, $a$, and inner peripheral flange, $b$.

C represents the brake-rim, constructed preferably, though not necessarily, in two or more sections, $c\ c$, to permit of the necessary expansion and contraction, and rigidly secured to the side of the wheel by means of transverse bolts $d$, as shown. This rim is preferably nearly the diameter of the wheel itself, and its periphery is sufficiently wide to present ample surface for the application of the brake-shoe.

Between the brake-rim and the side of the wheel I interpose some suitable non-conducting material, N, consisting of paper, asbestus, roofing fabric, or other suitable equivalent material, and by such means prevent the heat of the brake-rim from being communicated to the wheel and drawing the temper from the same.

My improved brake-rim, being a structure made separate and independent from the wheel, can be attached to wheels already made and in use at slight expense, the only change in the wheel required being the provision of the transverse holes for the passage of the securing-bolts.

Having thus described my invention, I claim as new—

1. The combination, with a car-wheel, of an independent brake-rim constructed in sections which are not joined together at their meeting edges, but are bolted or otherwise securely connected separately to the side of the wheel, substantially as described.

2. The combination, with a car-wheel, of a brake-rim bolted to the side of the wheel and separate and distinct from the supporting-tread of the wheel, and a non-conducting material interposed between the brake-rim and the wheel, substantially as described.

3. The combination, with the car-wheel, of the independent sectional brake-rim, the non-conducting material interposed between the rim and the side of the wheel, and the transverse securing-bolts, the whole arranged and operating substantially as described.

THOMAS B. HOWE.

Witnesses:
P. T. HOWE,
MELVILLE CHURCH.